Figure 1:
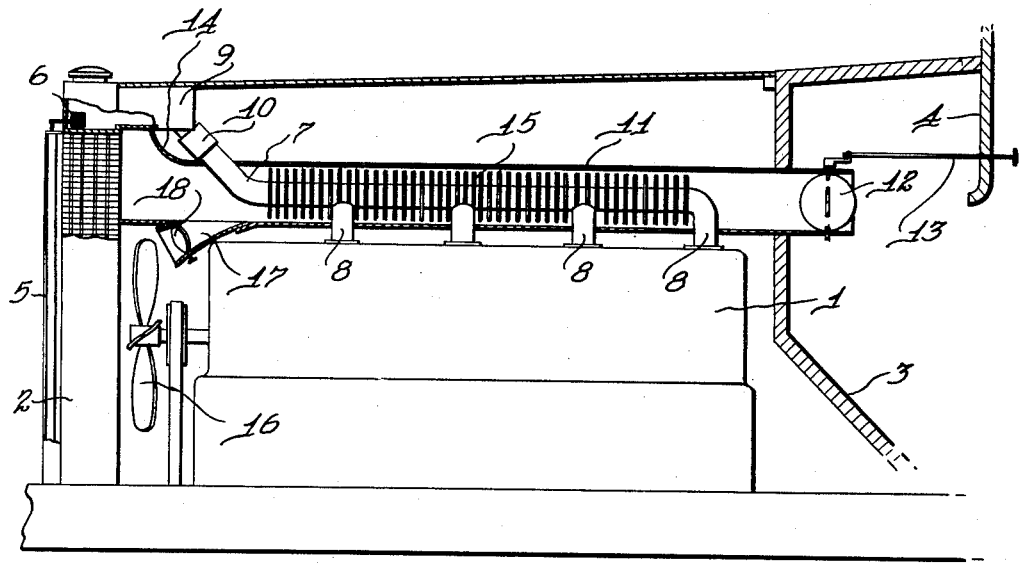

Dec. 13, 1932.   A. T. O'CONNOR   1,890,745
AUTOMOBILE HEATER
Filed March 8, 1930

INVENTOR
Alexander T. O'Connor
BY
ATTORNEYS

Patented Dec. 13, 1932

1,890,745

UNITED STATES PATENT OFFICE

ALEXANDER T. O'CONNOR, OF DETROIT, MICHIGAN, ASSIGNOR OF ONE-HALF TO GEORGE YEOMAN, OF BIRMINGHAM, MICHIGAN

AUTOMOBILE HEATER

Application filed March 8, 1930. Serial No. 434,397.

The present invention pertains to a novel automobile heater of the type which is particularly adapted for use in the closed type of automobile having little or no ventilation and although when the windows are closed particularly adapted for use in the above stated manner, due to the fact that it may be utilized to efficiently ventilate the automobile, it is also adapted for use in the open types of automobile or any other vehicle having an internal combustion engine to supply the motive power.

The primary object of the present invention is to devise an automobile heater capable of supplying a sufficient quantity of clean heated air into the passenger compartment of an automobile to maintain a warm temperature therein, the heat created by the running motor of the automobile being utilized for raising the temperature of the air. In utilizing the engine heat the present invention aims to avoid the use of the exhaust manifold, which is the part of the motor used by most conventional heaters, for the reason that it endangers the life of the passengers by introducing air into the passenger compartment which has previously bathed the exhaust manifold and which carries with it any of the poisonous gases that leak from the exhaust manifold and leakage of gases at this point is not at all uncommon.

Another object of the present invention is to devise an automobile heater which forcefully introduces heated air into the passenger compartment of the automobile and thereby creates, in the passenger compartment, an air pressure which is slightly above atmospheric pressure. As a result of this pressure any leakage of air through cracks, poor weather stripping, or around the operating pedals and levers, is in an outward direction. This feature in addition to preventing cold drafts of air also eliminates any danger of fumes or gases leaking from parts of the motor from entering the car through the floor-boards, thereby increasing the safety factor of the present heater.

A still further object of the present invention is to devise an automobile heater which is adapted to utilize the heating possibilities provided by the heating of the radiator and in so doing provide the automobile with a supply of clean heated air. The heater comprises a casing having connection with the passenger compartment of the automobile, this casing being adapted to collect the heat radiating from the upper portion of the automobile radiator and then subjecting it to contact with the water jacket upon the top of the engine which serves as a booster to raise the temperature of the air to a higher degree and increase the heating possibilities of the present heater.

Figure 2:
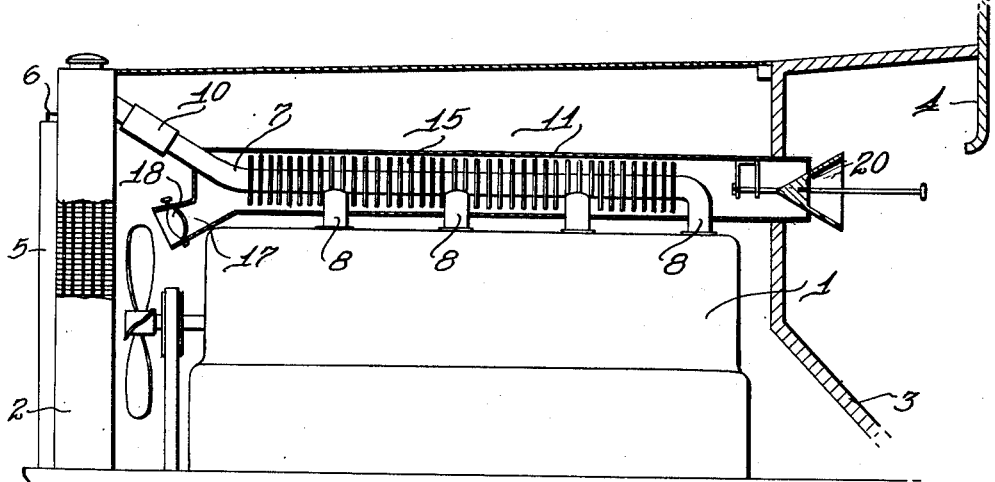

With the above and other ends in view the invention consists in the matters hereinafter set forth and more particularly pointed out in the appended claim, reference being had to the accompanying drawing, in which Figure 1 is a fragmentary cross sectional view of an automobile having the present type of heater mounted thereon, and Fig. 2 is a fragmentary cross sectional view of an automobile equipped with a slightly modified form of heater.

Like characters are employed to designate the corresponding parts throughout.

As illustrated in Fig. 1 of the drawing the numeral 1 designates in general the automobile motor, the automobile being provided with the usual radiator 2, toe boards 3 and the dash plate 4. The radiator 2 is equipped with a set of shutters 5 controlled by the thermostat 6 which is subjected to, and controlled by, the temperature of the water in the radiator and cooling system. The construction of the thermostat and shutters forms no part of the present invention and they may be of any suitable type found on the market.

In the present embodiment the water jacket which connects the radiator to the cooling system in the motor takes the form of a pipe 7 mounted upon the top of the motor and connected thereto as at 8, the opposite end of the pipe being connected to the expansion chamber 9 on the radiator. A suitable thermostat 10 is mounted in the pipe 7, in close proximity to the expansion chamber and this thermostat is of any suitable type which may be purchased upon the market and utilized to prevent circulation of the water through this pipe until the water reaches a certain temperature.

The heater casing comprises a pipe 11 which encircles the water jacket 7, the pipe being provided with a damper 12 at one end which opens into the interior of the automobile, the damper being controlled by a rod 13, extending through the dash plate 4 which may be operated by hand or a thermostat. The opposite end of the pipe is provided with an enlargement 14 which butts against the upper portion of the radiator. The pipe 11 is of a diameter considerably larger than the water jacket and permits the latter to be equipped with the heat radiating fins 15.

The motor 1 is equipped with the usual motor fan 16 to draw air through the fins of the radiator and a pipe 17 extends angularly from the pipe 15, the pipe 17 being in the nature of a funnel. A damper 18 is mounted in the mouth of the funnel 17 to control the amount of air passing therethrough, it being apparent that the motor fan may be utilized to force air into the casing or pipe 11.

In operation, the shutters 5 remain closed until a certain motor temperature is reached and the thermostat 10 prevents circulation of water in the motor cooling system until a certain temperature is reached and it is preferred to have the thermostats governed so that the circulation of the water in the cooling system is permitted before the shutters open. When the motor is started the water contained in the motor circulation system becomes heated rapidly because circulation is prevented by the thermostat 10 and the water jacket 7 becomes quite hot and the cool air which is forced into the pipe 11 through the funnel 17 by the motor fan 16 becomes readily heated as it contacts with the fins 15, thereby permitting heat to be introduced into the vehicle in a comparatively short time after starting the motor and also permitting the motor to be warmed up more rapidly.

When the motor reaches a certain temperature the thermostat 10 opens a valve and permits the water in the cooling system to circulate through the radiator and naturally in the course of the circulation the upper portion of the radiator becomes the hottest. When the water in the radiator becomes heated to the proper temperature the thermostat 6 opens the shutters 5 and therefore the air which is heated as it passes through the upper portion of the radiator is boosted in temperature as it contacts with the water jacket 7 and the radiating fins 15.

Forward movement of the automobile causes a flow of air through the pipe 11 and when the automobile is standing still the circulation is caused by the motor fan 16. The amount of air passing through the funnel 17 may be regulated by the damper 18 and although the regulating handle is illustrated as mounted directly upon the funnel it is obvious that a rod could be connected thereto to extend through the dash in order that this damper could be controlled from the interior of the automobile.

In Fig. 2 of the drawing the pipe or casing 11 is shown with the enlarged portion 14 eliminated and the entire heating is accomplished by the air being forced through the funnel 17 by the motor fan, the operation, with this exception being identical to that above described. The outlet of the pipe which emits the warm air into the automobile may be equipped with a cone shaped valve 20 instead of the butterfly valve 12 which is illustrated in Figure 1, this type of valve being capable of spreading the air as it is expelled into the vehicle.

Although specific embodiments of the present invention have been illustrated and described it is to be understood that various alterations may be made in the details of construction without departing from the spirit of the invention and such changes are contemplated.

What I claim is:

The combination with an automobile having a radiator, cooling fins in said radiator, an engine, a water jacket for said engine, a cooling fan, and a passenger compartment, of a pipe having one end connected to said radiator and its opposite end connected to said water jacket, heat radiating fins mounted on the outside of said pipe, a casing surrounding said pipe and having its front end opening against said radiator cooling fins, and its rear end opening into said passenger compartment, a thermostat in said pipe adapted to prevent circulation of water therethrough until a predetermined temperature has been reached, and a funnel-like air intake member mounted in said casing and having its intake end projecting into the path of the air current from said cooling fan.

In testimony whereof I affix my signature.

ALEXANDER. T. O'CONNOR.